United States Patent
Reinhart et al.

(10) Patent No.: US 10,357,039 B2
(45) Date of Patent: Jul. 23, 2019

(54) BAKING DEVICE

(71) Applicant: HAAS FOOD EQUIPMENT GMBH, Vienna (AT)

(72) Inventors: Adam Reinhart, Vienna (AT); Johannes Haas, Vienna (AT); Josef Haas, Leobendorf (AT); Stefan Jiraschek, Koenigsbrunn (AT)

(73) Assignee: Haas Food Equipment GmbH, Vienna (AT)

( * ) Notice: Subject to any disclaimer, the term of this patent is extended or adjusted under 35 U.S.C. 154(b) by 813 days.

(21) Appl. No.: 14/761,085

(22) PCT Filed: Jan. 17, 2014

(86) PCT No.: PCT/EP2014/050884
§ 371 (c)(1),
(2) Date: Jul. 15, 2015

(87) PCT Pub. No.: WO2014/111511
PCT Pub. Date: Jul. 24, 2014

(65) Prior Publication Data
US 2015/0373997 A1    Dec. 31, 2015

(30) Foreign Application Priority Data

Jan. 18, 2013    (AT) ........................ 37/2013

(51) Int. Cl.
*A21B 1/46* (2006.01)
*A21B 5/02* (2006.01)
*A21B 3/16* (2006.01)

(52) U.S. Cl.
CPC ................ *A21B 1/46* (2013.01); *A21B 5/023* (2013.01); *A21B 3/16* (2013.01); *A21B 5/02* (2013.01)

(58) Field of Classification Search
CPC .............. A21B 1/46; A21B 5/023; A21B 5/02
(Continued)

(56) References Cited

U.S. PATENT DOCUMENTS 2,624,297 A * 1/1953 Nuttall .................. A21B 5/023
16/344
2,640,444 A * 6/1953 Reget ....................... A21B 5/02
118/24

(Continued)

FOREIGN PATENT DOCUMENTS

DE         3840500 A1    6/1990
GB         2135178 A  *  8/1984 ............. A21B 5/023
WO    2012152675 A1   11/2012

*Primary Examiner* — Ibrahime A Abraham
*Assistant Examiner* — Spencer h Kirkwood
(74) *Attorney, Agent, or Firm* — Laurence A. Greenberg; Werner H. Stemer; Ralph E. Locher

(57) ABSTRACT

A baking device for producing baked goods, in particular for producing filled baked goods, includes baking presses that can be swung open and closed, can be moved from a feeding device through the baking chamber of the oven and to a goods removal device on a continuously moving continuous conveyor that circulates in the longitudinal direction of the oven. The baking presses have a lower baking mold and an upper baking mold, each movable between open and closed positions about a baking-press axis. The baking presses are connected to the continuous conveyor by releasable mechanical connections. The baking device also has a baking-press removal station at at least one point of the continuous conveyor, at which baking-press removal station baking presses can be removed and reattached. The removal and redelivery of the baking presses are performed on the continuously moving continuous conveyor.

19 Claims, 11 Drawing Sheets

(58) Field of Classification Search
 USPC .......................................................... 99/352
 See application file for complete search history.

(56) References Cited

U.S. PATENT DOCUMENTS

| | | | | |
|---|---|---|---|---|
| 4,058,039 A | * | 11/1977 | Schmid | A21B 5/023 83/155 |
| 5,787,800 A | | 8/1998 | Kloppenburg et al. | |
| 2002/0039612 A1 | * | 4/2002 | Gambino | A21D 13/36 426/283 |
| 2014/0090566 A1 | | 4/2014 | Haas et al. | |

\* cited by examiner

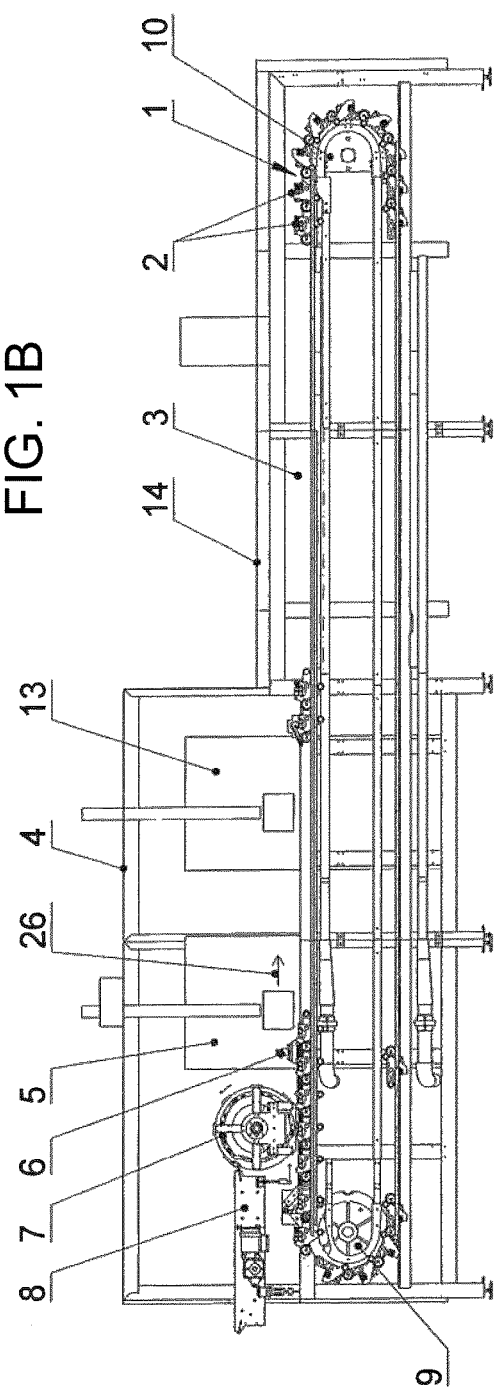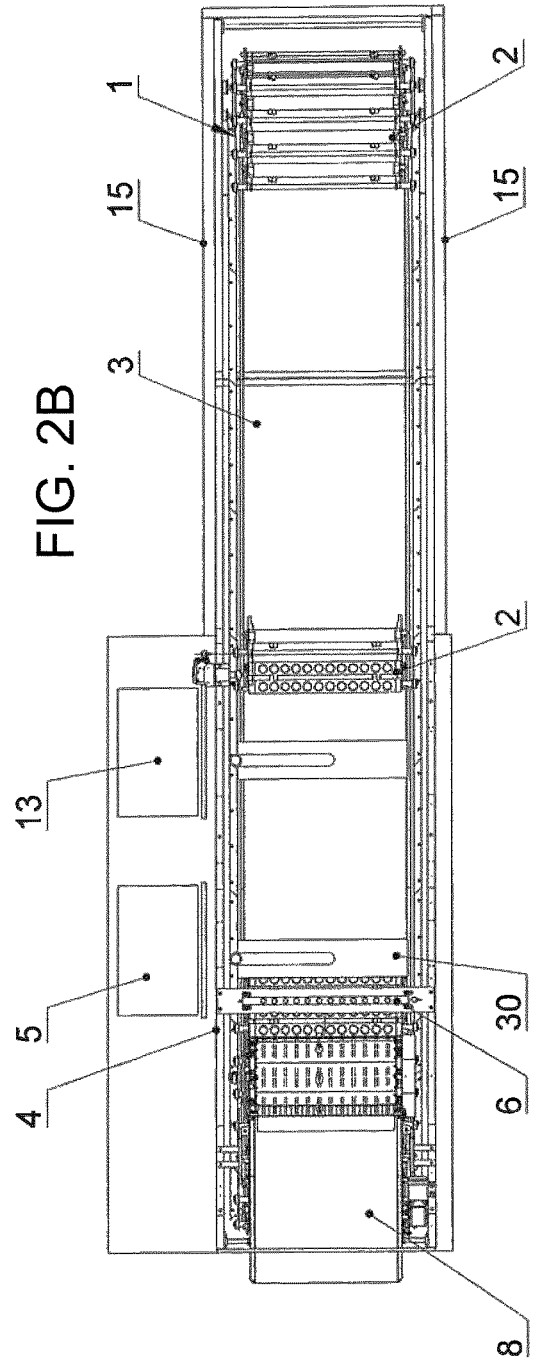

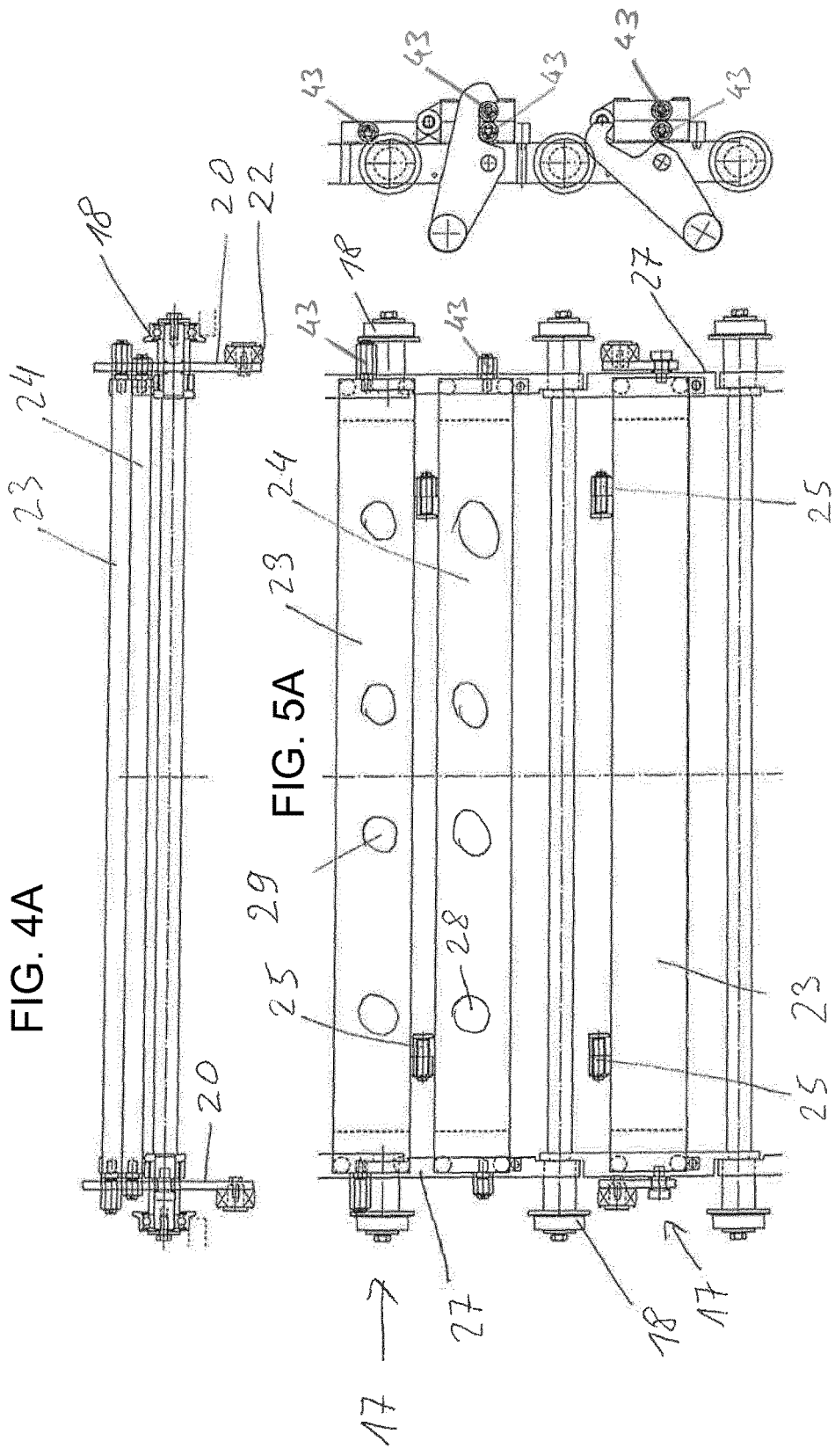

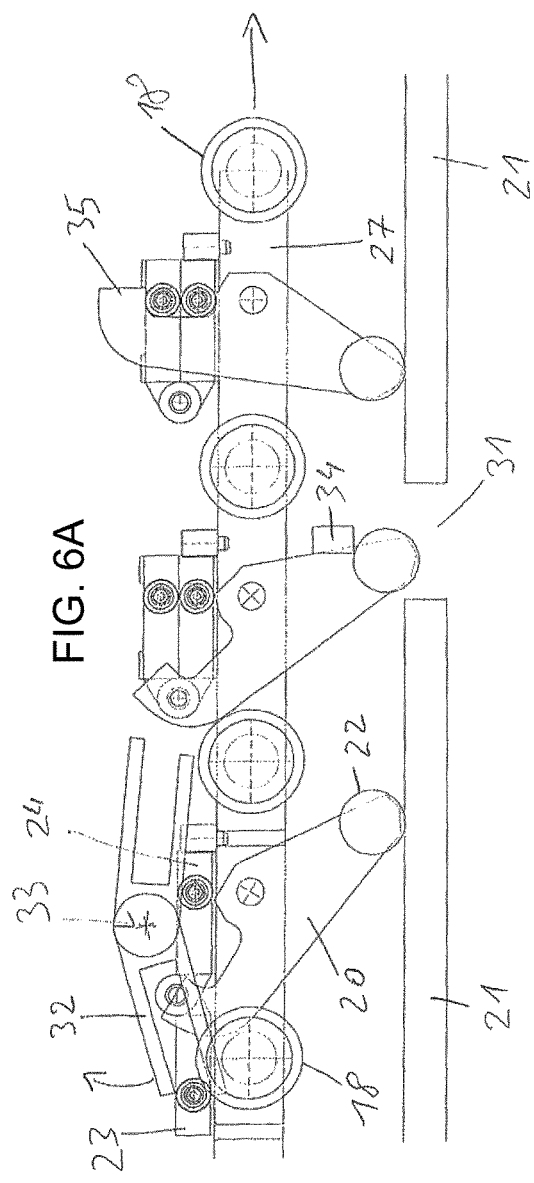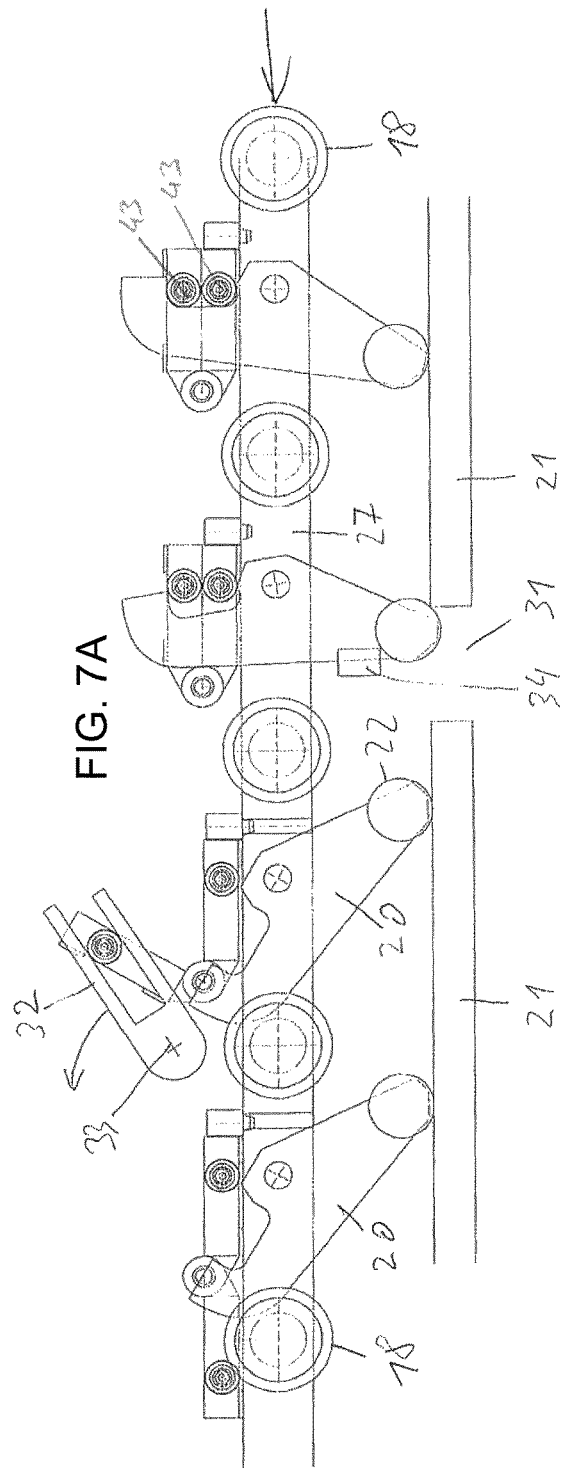

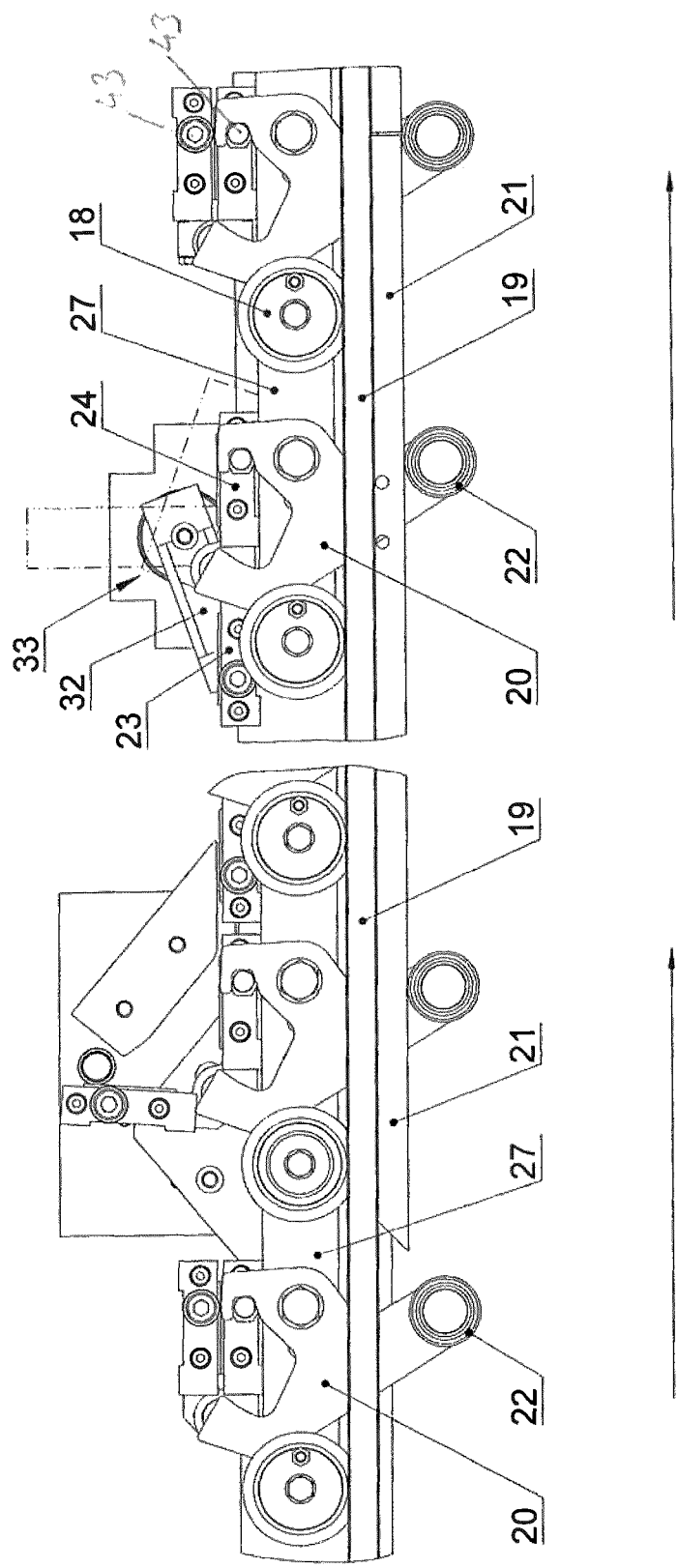

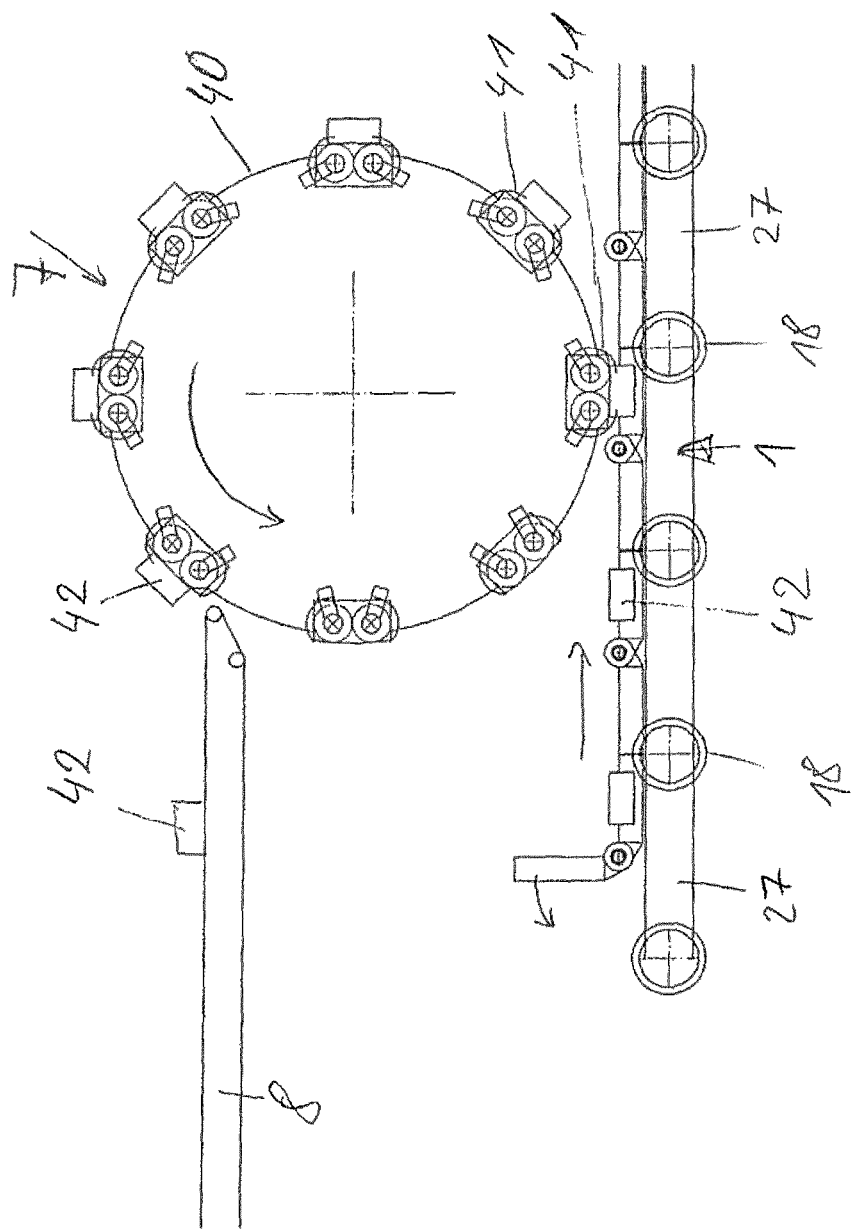

BAKING DEVICE

BACKGROUND OF THE INVENTION

Field of the Invention

The invention relates to a baking apparatus for producing baked products, in particular filled baked products. It is known to provide upper and lower baking mold halves in which a flowable creamy baking dough is introduced to produce filled baked products. The filling mass is applied to the introduced baking dough of the lower baking mold half and then the upper baking mold half filled with baking dough is placed onto or folded back onto the lower baking mold half and then baked in the baking oven.

The industrial ovens which have become known hitherto for the production of such filled baked products are designed for an intermittent procedure where in stations provided for this purpose, the filling process, the folding process, the baking and then the removal of the finished baked product are performed in steps. With this intermittent procedure, the capacity of such installations is limited, with the result that the costs for the products are increased appreciably.

BRIEF SUMMARY OF THE INVENTION

It is the object of the present invention to provide an industrial baking apparatus which is designed for a high output of baked products and which can be operated not intermittently but continuously. At the same time, possibilities should be provided for exchanging damaged or contaminated baking molds for repaired, cleaned or new baking molds during ongoing operation without needing to interrupt the production process.

The features of the invention can be deduced inter alia from the patent claims and the following description.

Optionally the invention relates to a baking apparatus for producing filled baked products, wherein the baking apparatus comprises openable and closable baking tongs, which can be moved by a loading device on an endless conveyor which circulates in the longitudinal direction of the baking oven, through the baking chamber of the baking oven and to a product removal device, wherein the baking tongs comprise a lower baking mold and an upper baking mold, which can each be moved about a baking tong axis between a 180° open position and a closed closure position and can be locked in the closed position and which are characterized in that the loading device comprises at least one dough loading device for loading the lower and upper baking molds in the opened position and at least one filling mass loading device for applying the filling mass to the layer of the lower and/or upper baking mold loaded with dough.

Optionally it is provided that the baking tong axes are arranged transversely to the conveying direction of the endless conveyor, preferably at an angle of 90° thereto. Optionally it is provided that the baking tongs are fastened or can be fastened on the chain links of the endless conveyor. Optionally it is provided that a folding device is provided for each baking tong for opening and closing the baking tongs, wherein the folding devices are controlled according to the respective position along the endless conveyor so that the baking tongs are moved in the closed position or open position. Optionally it is provided that the baking tongs in the closed position are closed by a locking device and are firmly connected to the endless conveyor. Optionally it is provided that the locking devices and the movements thereof are controlled by a control rail. Optionally it is provided that the baking tongs are connected by means of detachable mechanical connections to the endless conveyor and that the baking apparatus comprises a baking tong removal station at at least one location of the endless conveyor at which baking tongs can be removed for a subsequent overhaul such as, for example, cleaning, and replaced again. Optionally it is provided that the endless conveyor is moved continuously and optionally that the removal and return of the baking tongs takes place on the continuously moving endless conveyor. Optionally it is provided that the folding devices for opening and closing the baking tongs are arranged in front of the product removal station and in front of the inlet into the baking chamber. Optionally it is provided that after loading the lower baking mold with dough, a pre-baking device is provided in order to pre-bake the dough.

Preferably the invention relates to a baking apparatus for producing baked products, in particular for producing filled baked products, wherein the baking apparatus comprises openable and closable baking tongs, which can be moved by a loading device on a continuously moving endless conveyor which circulates in the longitudinal direction of the baking oven, through the baking chamber of the baking oven and to a product removal device, wherein the baking tongs comprise a lower baking mold and an upper baking mold, which can each be moved about a baking tong axis between an open position and a closed closure position, characterized in that the baking tongs are connected by means of detachable mechanical connections to the endless conveyor, that the baking apparatus comprise a baking tong removal station at at least one location of the endless conveyor at which baking tongs can be removed and replaced again, and that the removal and return of the baking tongs takes place on the continuously moving endless conveyor.

Optionally it is provided that the detachable mechanical connection is formed by a locking device and that the locking devices and the movements thereof are controlled by a control rail. Optionally it is provided that the baking tongs can be closed or are closed by the locking devices and that the baking tongs can be firmly connected or are connected by the locking devices to the endless conveyor. Optionally it is provided that locking levers are provided which are controlled by the control rail and that the locking levers each have a control wheel at the ends facing the control rail. Optionally it is provided that the baking tongs are fastened or can be fastened on chain links of the endless conveyor. Optionally it is provided that the baking tongs sit on the chain links on both sides of the endless conveyor and are held firmly on this in the closed position by locking levers.

Optionally it is provided that the release of the baking tongs is accomplished by opening the locking lever. Optionally it is provided that the baking tongs comprise retaining pins and that the locking lever holds the baking tongs optionally with the locking fork thereof firmly closed over the retaining pins and also firmly connected to the chain link of the endless conveyor. Optionally it is provided that at the rear end on the baking chamber side, at the deflecting roller a baking tong removal station containing the baking tong removal device and the baking tong delivery device are provided. Optionally it is provided that the baking tong removal device comprises a gripping beam on which movable and lowerable or raisable gripping fingers are provided so that a baking tong can be raised from the endless conveyor and conveyed out from the baking chamber and can be transferred to a transport device for subsequent processing. Optionally it is provided that movable and lowerable or raisable gripping fingers are provided on the gripping beam which can be lowered in order to engage in the baking tong to be exchanged and in order to raise the baking tong from the endless conveyor, convey it from the baking chamber and transfer it to a transport device for subsequent processing.

Optionally it is provided that the baking tong delivery device comprises a feed conveyor by means of which a new baking tong is preferably brought up to the lower section of the endless conveyor. Optionally it is provided that the supplied new baking tongs are preheated before transfer so that a constant baking temperature is ensured or that a supplied baking tong is preheated in a heating device so that the constant temperature is maintained to receive new baking dough. Optionally it is provided that the baking tongs comprise a lower baking mold and an upper baking mold which can each be moved about a baking tong axis between an 180° open position and a closed closure position and can be locked in the closed position and that the loading device comprises at least one dough loading device for loading the lower and upper baking molds in the opened position and at least one filling mass loading device for applying the filling mass to the layer of the lower and/or upper baking mold loaded with dough. Optionally it is provided that the baking tong axes are arranged transversely to the conveying direction of the endless conveyor, preferably at an angle of 90° thereto. Optionally it is provided that a folding device is provided for each baking tong for opening and closing the baking tongs, wherein the folding devices are controlled according to the respective position along the endless conveyor so that the baking tongs are moved in the closed position or open position and that the folding devices for opening and closing the baking tongs are arranged in particular in front of the product removal station and in front of the inlet into the baking chamber.

Optionally it is provided that the baking tongs are arranged on the endless conveyor consecutively in the conveying direction from the loading and removal station into the baking chamber and after passing the deflecting roller are moved back again to the loading and removal station and that the baking tongs are brought by the second deflecting roller again into the upper section of the endless conveyor where the respective baking tong again emerges from the baking chamber in the lower section of the endless conveyor and after passing the deflecting roller is opened in order to be able to remove the products. Optionally it is provided that baking tong carriages are provided which have running wheels on both sides, with which they run on running rails of the baking oven.

The invention will be explained in detail hereinafter with reference to the drawings.

BRIEF DESCRIPTION OF THE SEVERAL VIEWS OF THE DRAWING

FIGS. 1a and 1b show schematically the side view of a baking apparatus,

FIGS. 2a and 2b show the plan view of the baking apparatus,

FIGS. 4a, 4b and 5a, 5b show two views of the tong carriage,

FIGS. 6 and 7 show schematically the back plates of the tong carriage in various functional positions, FIGS. 9a and 9b show the product removal station at the left end of the endless conveyor according to FIG. 1.

DESCRIPTION OF THE INVENTION

Figure 1A:
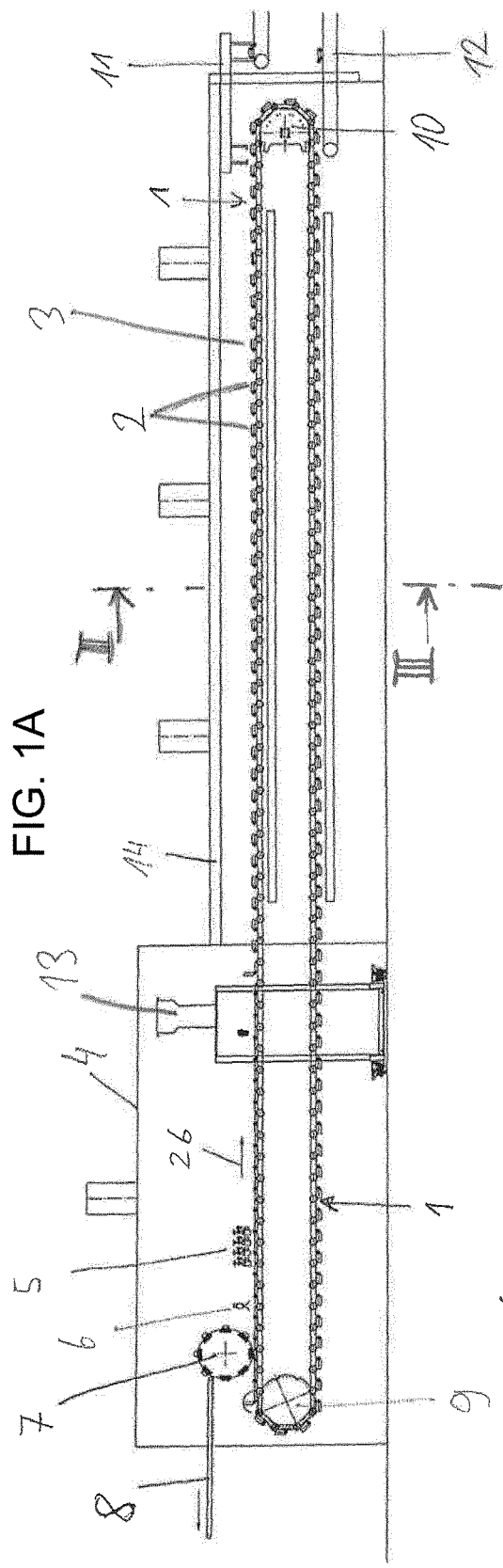

FIGS. 1a and 1b can be understood by themselves with reference to the information in the reference list, the endless conveyor 1 moves the baking tongs 2 located consecutively thereon in the conveying direction 26 from the loading and removal station 4 into the baking chamber 3 and after passing the deflecting roller 10 back again to the loading and removal station. The second deflecting roller 9 brings the baking tongs again into the upper section of the endless conveyor. The conveying drive is accomplished at least via one of the two deflecting rollers 9 and/or 10.

The baking tongs which are closed over the most part of the circulation of the endless conveyor are opened after passing the deflecting roller 9 so that the upper and lower baking mold of each baking tong come to lie in the 180° position and the relevant baking mold recesses are accessible from above. The product removal device 7 removes the filled baked product preferably from the lower baking mold and places it on the product conveyor from which the baked products are supplied to further processing such as cooling station, packaging etc.

Figure 2A:
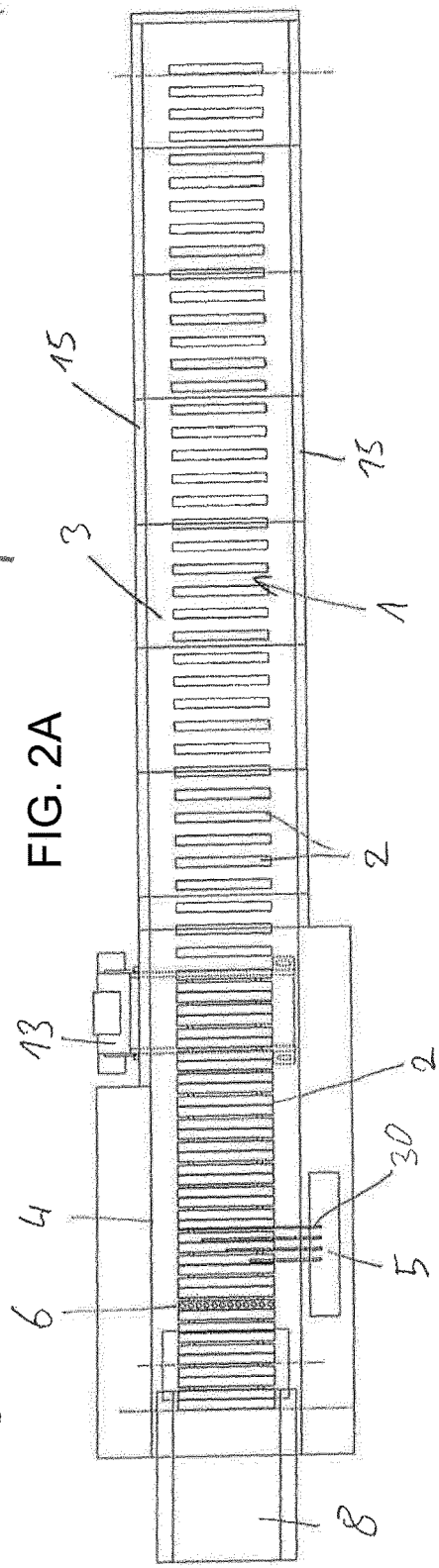

The opened baking tongs pass through the release agent spray station 6 and then filled in the dough loading device 5 where the baking mold recesses of the lower baking mold and the upper baking mold are correspondingly filled with dough. As can be seen in FIGS. 2a and 2b, in this example four dough feed tubes 30 are depicted with the result that four adjacently located baking mold recesses per baking mold can be loaded.

After loading with dough, if desired a pre-baking for example of the lower baking mold, can be accomplished in order to give this dough portion a firmer consistency.

In the filling mass loading station 13, the filling mass is applied onto the filled dough layers, e.g. of the lower baking mold and after passing the filling mass loading device and before entering into the baking chamber 3 the baking tongs are firmly closed. The subsequent baking process then takes place in the baking chamber whilst maintaining the required baking time until the respective baking tong in the lower section of the endless conveyor emerges from the baking chamber again and after passing the deflecting roller 9 is opened in order to be able to remove the products.

In FIGS. 1a and 1b a baking tong removal device 11 and a baking tong feed device 12 are provided at the rear end on the baking chamber side at the deflecting roller 10. These devices provided as desired serve to remove harmful or contaminated baking tongs during the baking process from the endless conveyor and supply them to further processing such as, for example, cleaning. Cleaned or repaired or new baking tongs can be delivered immediately after removal back to the empty place on the endless conveyor so that the seamless sequence of the baking tongs on the endless conveyor is always ensured. The new baking tongs supplied are pre-heated before transfer so that constant baking temperature is ensured.

Figure 3A:
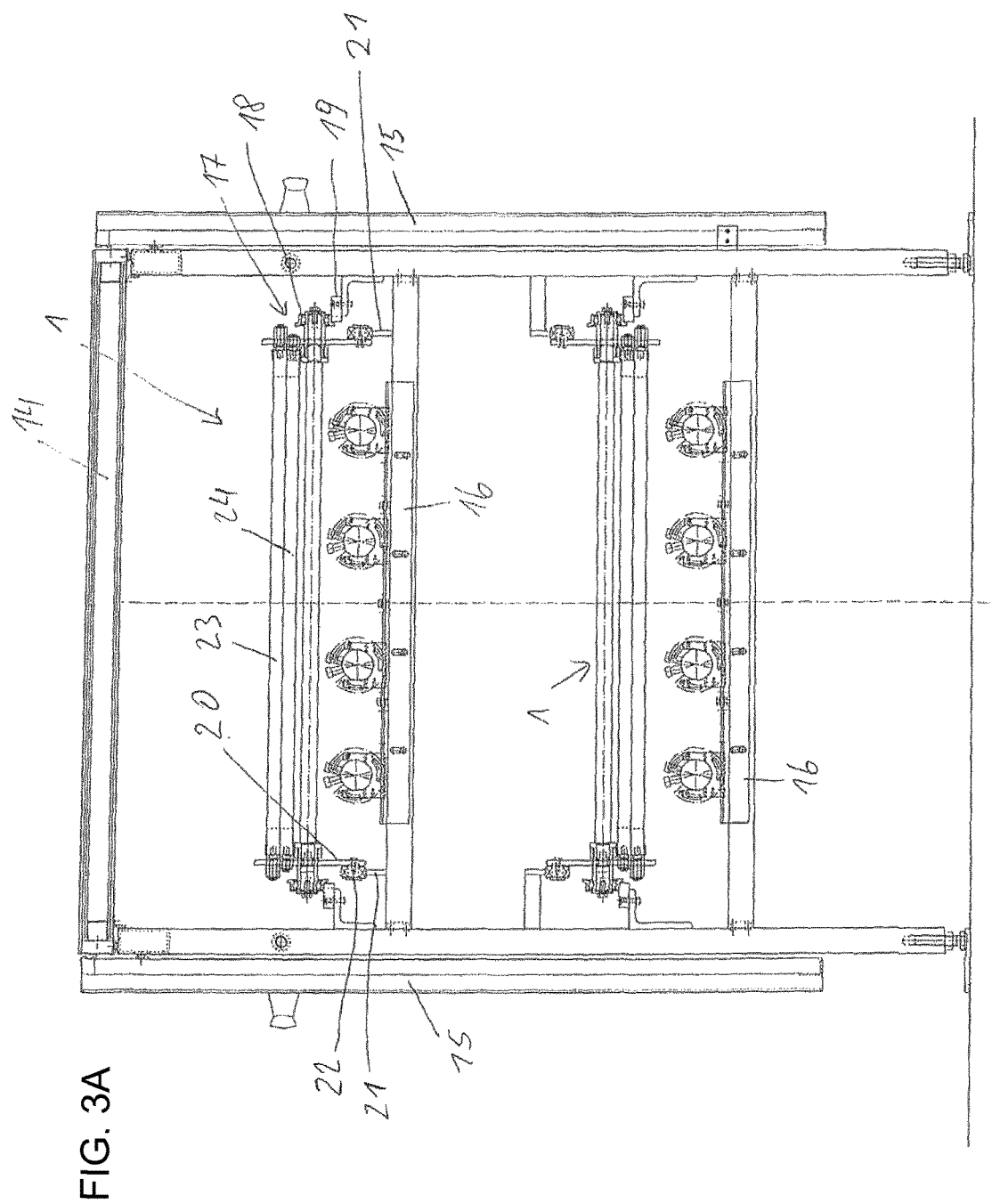
FIGS. 3a and 3b show an enlarged section along line III.III in FIG. 1.
Figure 3B:
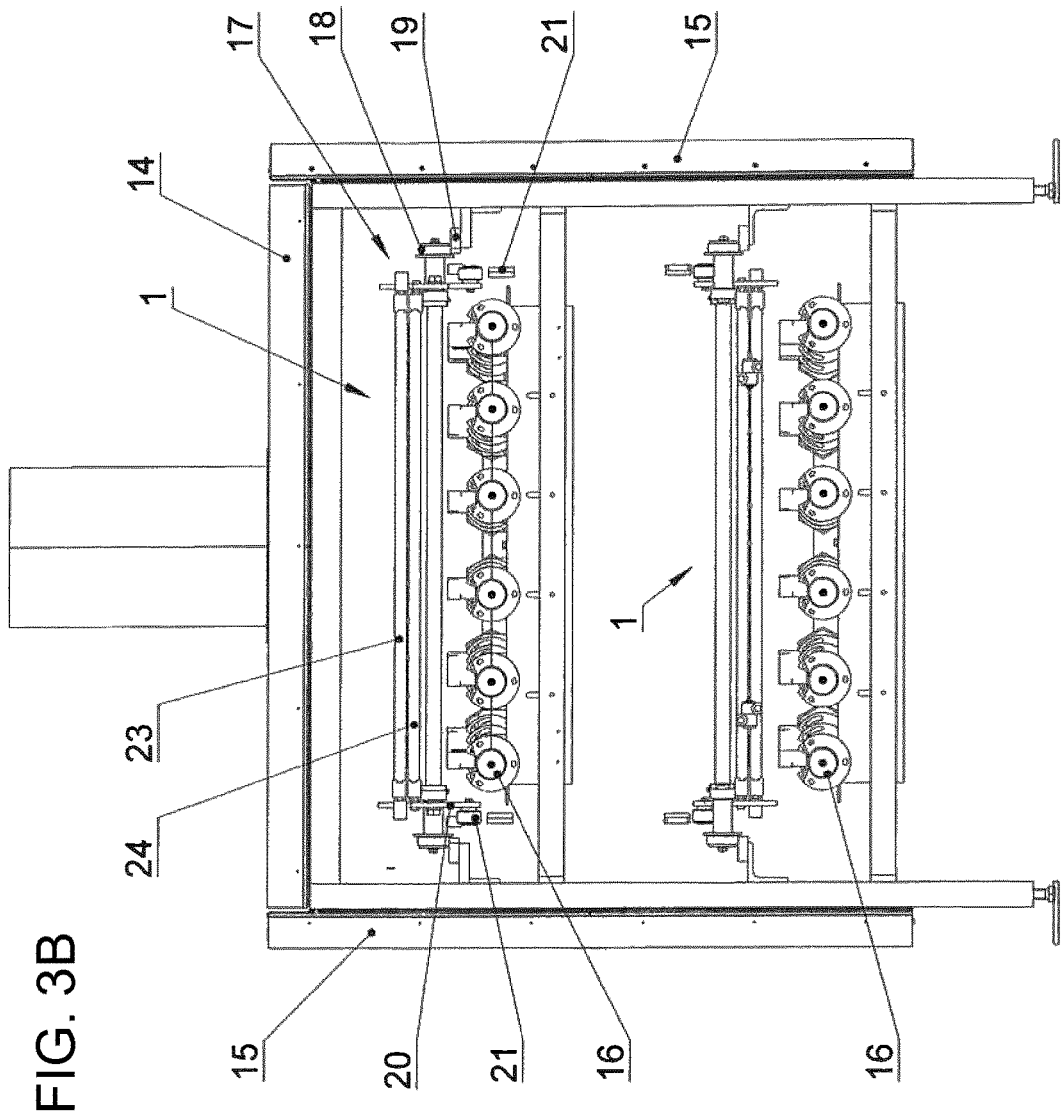

FIGS. 3a and 3b show the upper and lower section of the endless conveyor 1 in section and this drawing can also be largely understood by reference to the description of the reference numbers. A heater 16 which for example can be a gas heater or any other type of heating is depicted. The baking tong carriages 17 have running wheels 18 on both sides by which means they run on the running rails 19 of the baking oven. In FIGS. 3a and 3b the baking tongs are closed so that the upper and lower baking mold each lie one upon the other. The locking levers 20 described in detail subsequently are controlled by the control rail 21 where the locking levers each have a control wheel 22 at the ends facing the control rail.

Figure 4B:
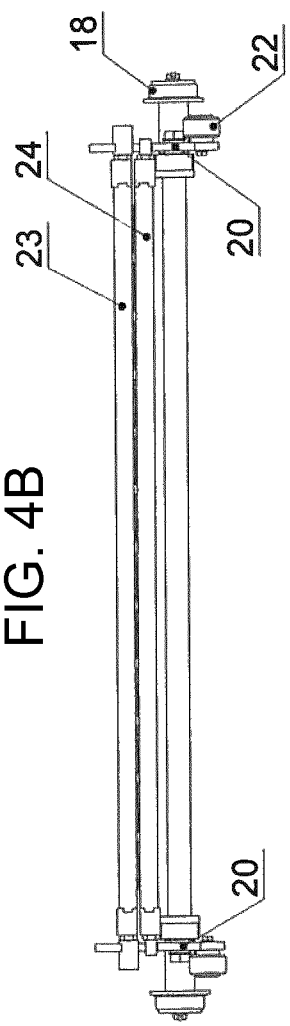
Figure 5B:
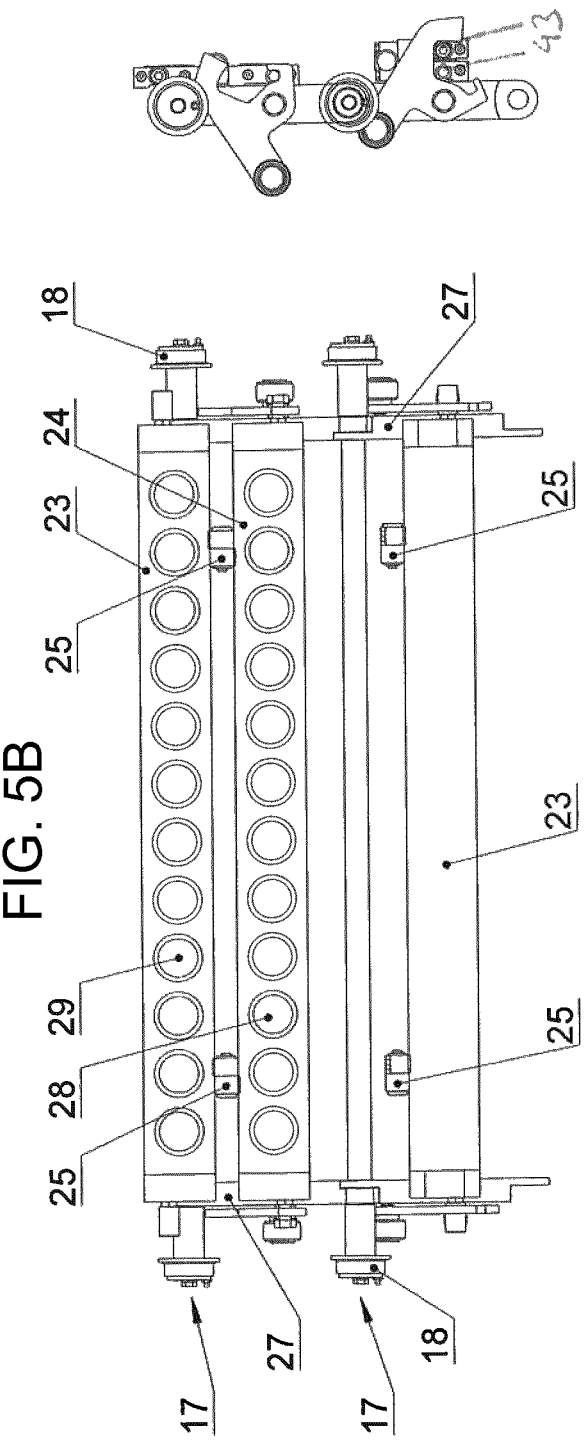

FIGS. 4a, 4b, 5a and 5b show the structure of the baking tong carriage 17. FIGS. 4a and 4b show the view with viewing direction in the conveying direction. FIGS. 5a and 5b show the plan view of two linked baking tong carriages where the baking tong indicated at the top in FIGS. 5a and 5b is opened and the lower baking tong is closed. The pivot axis for the upper baking mold 23 and lower baking mold 24 is given by the baking tong axes 25. The baking tongs sit on the chain links 27 on both sides of the endless conveyor and are held firmly on this in the closed position by locking levers 20, as is explained in detail by reference to FIGS. 6a and 6b and 7.

FIG. 6a shows three different functional positions of the locking lever 20. The locking lever 20 is opened in the left position and the control wheel 22 runs on the control rail 21. As is also indicated, the fork 32 of the folding device 33 acts on the upper baking mold 23 which closes the baking tong and therefore goes into the position as depicted in the center of FIG. 6a. At the same time, locking lever 20 goes into a position in which the control rail 21 comprises the control gap or control recess 31 and by means of a blocking finger 34, the locking lever 20 moving to the right is turned so far that it holds the baking tong firmly closed with its locking fork 35 over the retaining pins 43 and also firmly connected to the chain link 27 of the endless conveyor. By means of the control rail 21 the locking lever 20 is held in the closed position until as a result of a further control gap, the locking lever 20 is opened and by means of the folding device 33 the upper baking mold is again brought into the horizontal position as is required for removal of the baked product. FIGS. 7a and 7b show the opening process where however the direction of movement is directed in the other direction to the left.

Figure 8:
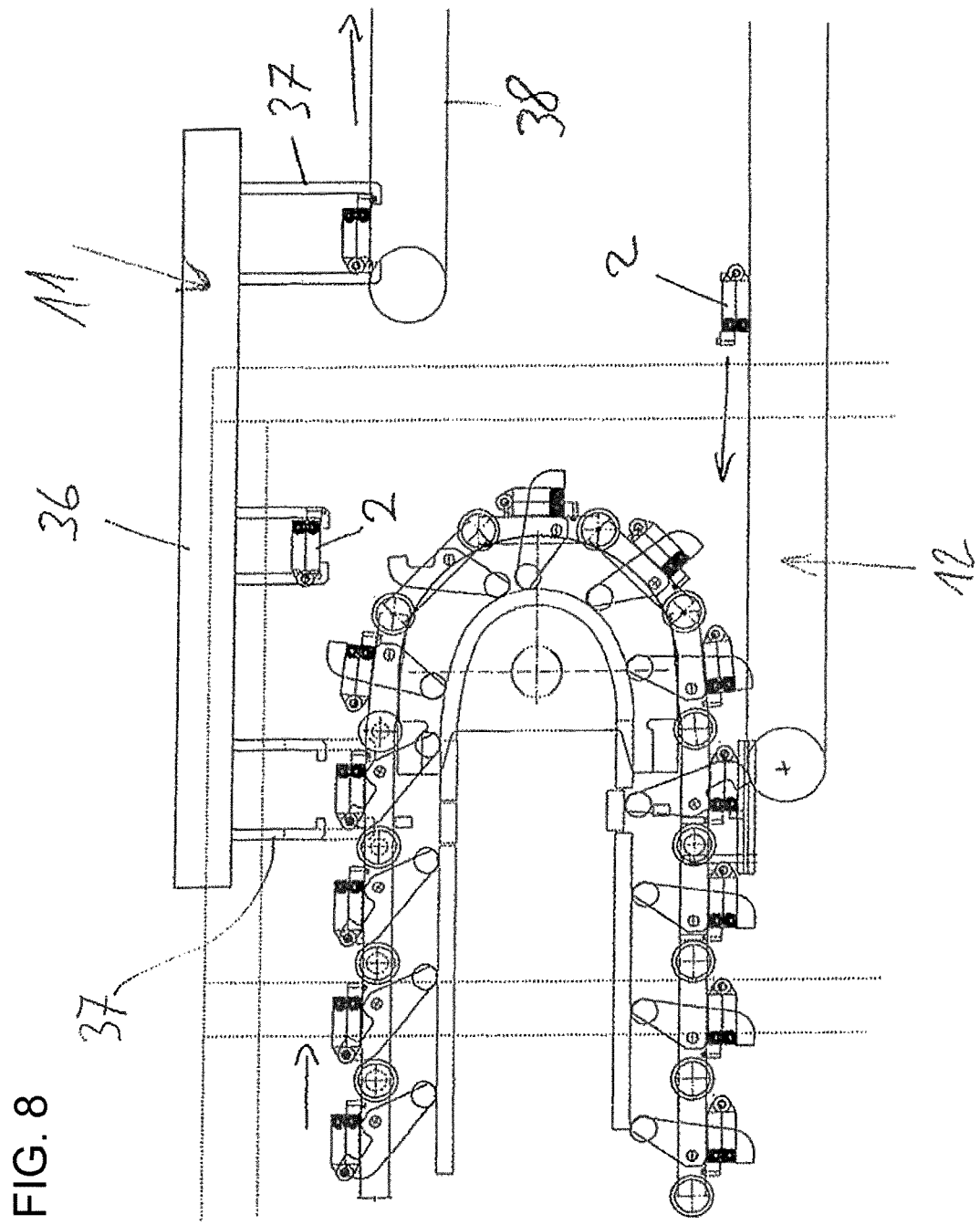
FIG. 8 shows schematically the side view of the end of the endless conveyor located in the baking chamber with schematic view of the removal device and feed device for the baking tongs.

FIG. 8 shows the operating mode of the baking tong removal device and the appurtenant baking tong feed device.

If a baking tong is to be removed from the baking process and replaced by another baking tong, which for example can be determined by corresponding sensors, the locking lever is opened and the baking tong released. Movable and lowerable or raisable gripping fingers 37 are provided on a gripper beam 36, which are shown here in three different positions. In the left position the gripping fingers 37 are lowered and grip the baking tong to be exchanged. The baking tong is raised from the endless conveyor and is conveyed to the right from the baking chamber and transferred to subsequent processing to a transport device 38. A gap in the sequence of the baking tongs is thus formed on the endless conveyor which is to be closed again.

As depicted at the bottom of FIG. 8, a new baking tong is brought by the feed conveyor 39 to the lower section of the endless conveyor, is locked by the locking levers and thus the gap is closed again. Preferably the supplied baking tong is pre-heated in a heating device so that constant temperature is maintained to receive new baking dough.

Figure 9B:
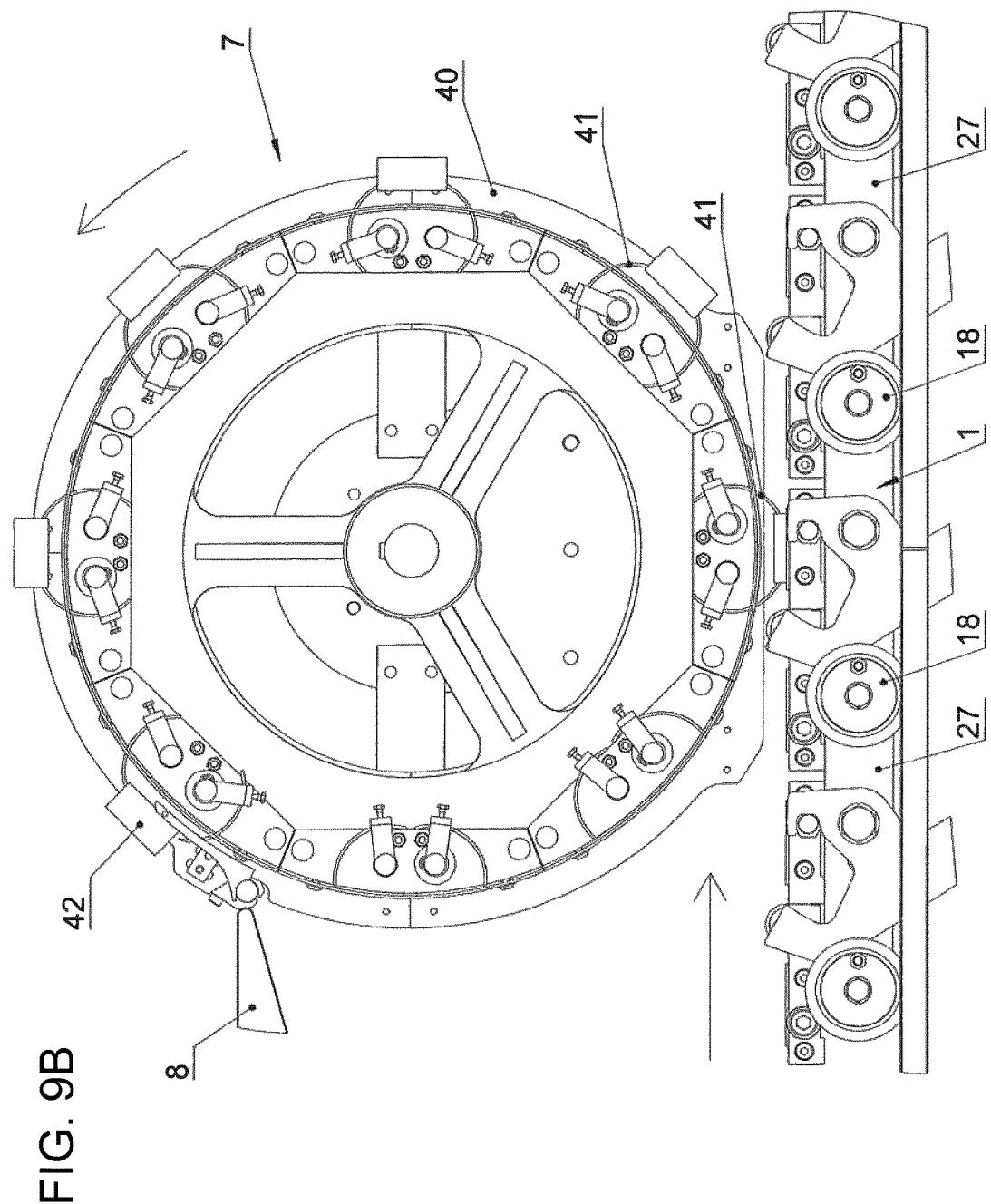

FIG. 9 shows the product removal device 7 comprising a removal drum 40 which in a manner known per se removes the product 42 by means of needle removers 41 and places it on the product conveyor 8.

According to a preferred embodiment, as shown in section in FIG. 8b, the baking device is designed as a baking device with circulating baking tongs. The baking tongs comprise an upper baking mold 23 and a lower baking mold 24. In the folded-together position the baking tong 2 or the upper baking mold 23 and lower baking mold 24 thereof form a baking mold in which the introduced baking mass such as, for example dough can be baked-through or baked. The baking tongs are optionally fixed on an endless conveyor 1 in order to be moved along the course of the endless conveyor through the baking device. In particular the baking device comprises a baking chamber 3. The endless conveyor with the baking tongs 2 extends through the baking chamber 3 whereby the baking tongs 2 are moved through the baking chamber with the moving endless conveyor. The endless conveyor 1 is guided around a front deflecting roller 9 and a rear deflecting roller 10 and deflected. The axes of rotation of the two deflecting rollers 9, 10 run substantially horizontally with the result than an upper section of the endless conveyor and a lower section of the endless conveyor are formed. The two sections run substantially parallel to one another and above one another.

In the baking process in a first step at least one baking tong is opened. In the opened state the baking tong passes through a loading station in which the baking mass is applied to the upper and/or the lower baking mold. Subsequently the baking tong is closed and optionally locked. Subsequently the baking tong is conveyed along the endless conveyor through the baking chamber 3. At the rear deflecting roller 10 the baking tong is moved from the upper section of the endless conveyor into the lower section of the endless conveyor. In the case of baking tongs 2 located on the endless conveyor 1 it is necessary that during this change from the upper section of the endless conveyor into the lower section of the endless conveyor and an optionally effected turning of the baking tongs through 180°, the baking tongs 2 are connected to the endless conveyor so that the baking tongs cannot become detached from the endless conveyor. For this purpose a detachable mechanical connection is provided by which means the baking tongs can be connected and/or are connected to the endless conveyor. This detachable mechanical connection is, for example, a locking device, a locking lever or a locking fork. The detachable mechanical connection is in particular detachable and/or connectable by a controller. For example, the baking device comprises a control rail which is suitable for the movement and/or control of the detachable mechanical connection and in particular the locking devices. For example, the locking levers 20 of the locking devices have a control wheel 22 which runs on a control rail 21 or scans this. The control rail optionally has a control gap or control recess 31 by which means the locking lever is twisted, whereby on the one hand the baking tong can be firmly closed and/or on the other hand, a connection of the baking tong to the endless conveyor is made. Optionally the control gap or the control recess 31 is closed whereby no change in the state of the locking device is brought about. According to the invention, the baking tongs can be removed when the baking apparatus is running and preferably without needing to stop the endless conveyor. To this end, the detachable mechanical connection can be released. Subsequently the baking tong can be removed from the endless conveyor by a removal station. After the removal station, the baking tong can, for example, be cleaned or processed. Optionally a new baking tong is supplied by the loading station. Optionally this baking tong is pre-heated before connection to the endless conveyor. The removal station for example comprises the gripping beam 36 or gripping fingers by which means the baking tong can be removed from the endless conveyor. The removal of the baking tong from the endless conveyor is preferably automated.

The loading station optionally comprises a feed conveyor by which means the new or cleaned baking tongs can be supplied. The supply of the baking tong onto the endless conveyor is preferably automated.

The baking tongs are preferably arranged on the upper section of the endless conveyor, lying on the endless conveyor. In the lower section of the endless conveyor, the baking tongs are preferably connected to the endless conveyor, suspended below the endless conveyor. In this embodiment the baking tongs are arranged at each position of the endless conveyor on its outer side. Preferably the locking levers 20 or the locking device are or is configured in such a manner that as a result the baking tong can on the one hand be connected to the endless conveyor.

On the other hand the locking device or the locking levers can be configured in such a manner that the baking tong can thereby be locked in the closed state. Preferably at each baking tong a locking lever 20 is provided at least on one side. Particularly preferably two locking levers 20 per baking tong are provided on both sides of the baking tong.

According to a preferred embodiment, the locking levers 20 are connected to the endless conveyor via an axis of rotation. The axis of rotation preferably runs normally to the direction of movement of the respective baking tong, particularly preferably parallel to the axes of rotation of the deflecting rollers. The endless conveyor is, for example, formed by chain links 27 which are arranged consecutively along the direction of movement of the endless conveyor and are deflected around the deflecting rollers. The locking lever 20 comprises two lever sections projecting from the axis of rotation. The control wheel 22 is provided on one lever section. This control wheel runs on the control rail 21. As a result of the configuration of the control rail 21, the twisting of the locking lever 20 about the axis of rotation can be controlled. To this end, for example, a control gap 31 is provided which can optionally be closed. If the control gap is present, the locking lever 20 is turned about the axis of rotation whereby the part of the locking lever 20 projecting on the other side changes its position. This projecting part which is arranged on the opposite side of the control wheel 22 comprises the locking fork 35. The locking fork 35 is adapted to lock the baking tong. Through the locking the baking tong is connected to the endless conveyor and/or the baking tong is held in a closed position. If the control gap is closed, however, as shown for example in FIG. 8, no movement of the locking lever 20 takes place to change the mechanical connection between the baking tong and the endless conveyor. In this case, the baking tongs are conveyed in a conventional manner through the baking chamber connected to the endless conveyor. If however the controller is designed to release the mechanical connection, subsequently the non-locked baking tong can be removed from the endless conveyor by the removal device. Alternatively to a control gap, an alternative geometry of the control rail can bring about a twisting of the locking lever. The geometry or the course of the control rail is designed to be variable so that each individual baking tong is locked or released as desired.

Thus, as a result of the construction a detachable mechanical connection exists between the baking tong and the endless conveyor which furthermore is a controllable detachable mechanical connection.

Optionally the invention relates to a baking apparatus for producing baked products, in particular for producing filled baked products, wherein the baking apparatus comprises openable and closable baking tongs, which can be moved by a loading device on a continuously moving endless conveyor which circulates in the longitudinal direction of the baking oven, through the baking chamber of the baking oven and to a product removal device, wherein the baking tongs comprise a lower baking mold and an upper baking mold, which can each be moved about a baking tong axis between an open position and a closed closure position, characterized in that the baking tongs are connected by means of detachable mechanical connections to the endless conveyor, that the baking apparatus comprise a baking tong removal station at at least one location of the endless conveyor at which baking tongs can be removed and replaced again, and that the removal and return of the baking tongs takes place on the continuously moving endless conveyor.

Optionally it is provided that the detachable mechanical connection is formed by a locking device and that the locking devices and the movements thereof are controlled by a control rail.

Optionally it is provided that the baking tongs in the closed position can be closed or are closed by the locking devices and that the baking tongs can be firmly connected or are connected by the locking devices to the endless conveyor.

Optionally it is provided that locking levers are provided which are controlled by the control rail and that the locking levers each have a control wheel at the ends facing the control rail.

Optionally it is provided that the baking tongs are fastened or can be fastened on chain links of the endless conveyor.

Optionally it is provided that the baking tongs sit on the chain links on both sides of the endless conveyor and are held firmly on this in the closed position by locking levers. Optionally it is provided that the release of the baking tongs is accomplished by opening the locking lever. Optionally it is provided that the baking tongs comprise retaining pins and that the locking lever holds the baking tongs optionally with the locking fork thereof firmly closed over the retaining pins and also firmly connected to the chain link of the endless conveyor. Optionally it is provided that at the rear end on the baking chamber side, at the deflecting roller a baking tong removal station containing the baking tong removal device and the baking tong delivery device are provided. Optionally it is provided that the baking tong removal device comprises a gripping beam on which movable and lowerable or raisable gripping fingers are provided so that a baking tong can be raised from the endless conveyor and conveyed out from the baking chamber and can be transferred to a transport device for subsequent processing. Optionally it is provided that movable and lowerable or raisable gripping fingers are provided on the gripping beam which can be lowered in order to engage in the baking tong to be exchanged and in order to raise the baking tong from the endless conveyor, convey it from the baking chamber and transfer it to a transport device for subsequent processing. Optionally it is provided that the baking tong delivery device comprises a feed conveyor by means of which a new baking tong is preferably brought up to the lower section of the endless conveyor. Optionally it is provided that the supplied new baking tongs are preheated before transfer so that a constant baking temperature is ensured or that a supplied baking tong is preheated in a heating device so that the constant temperature is maintained to receive new baking dough.

Optionally the invention relates to a baking apparatus for producing filled baked products according to the preceding description, which is characterized in that the baking tongs comprise a lower baking mold and an upper baking mold which can each be moved about a baking tong axis between an 180° open position and a closed closure position and can be locked in the closed position and that the loading device comprises at least one dough loading device for loading the lower and upper baking molds in the opened position and at least one filling mass loading device for applying the filling mass to the layer of the lower and/or upper baking mold loaded with dough.

Optionally it is provided that the baking tong axes are arranged transversely to the conveying direction of the endless conveyor, preferably at an angle of 90° thereto. Optionally it is provided that a folding device is provided for each baking tong for opening and closing the baking tongs, wherein the folding devices are controlled according to the respective position along the endless conveyor so that the baking tongs are moved in the closed position or open position and that the folding devices for opening and closing the baking tongs are arranged in particular in front of the product removal station and in front of the inlet into the baking chamber.

Optionally it is provided that the baking tongs are arranged on the endless conveyor consecutively in the conveying direction from the loading and removal station into the baking chamber and after passing the deflecting roller are moved back again to the loading and removal station and that the baking tongs are brought by the second deflecting roller again into the upper section of the endless conveyor where the respective baking tong again emerges from the baking chamber in the lower section of the endless conveyor and after passing the deflecting roller is opened in order to be able to remove the products. Optionally it is provided that baking tong carriages are provided which have running wheels on both sides, with which they run on running rails of the baking oven.

The baking apparatus according to the invention comprises a baking tong removal station. In this baking tong removal station individual baking tongs—preferably automated—can be removed from the endless conveyor. In addition, individual baking tongs can be supplied back to the endless conveyor—preferably automated. The baking tong removal station thus comprises a baking tong removal device and a baking tong feed device. Optionally these two devices—i.e. the baking tong removal device and the baking tong feed device—can be designed as a single device. For example, conventional industrial robots can be used to remove baking tongs and return them again. To this end, as described further above, gripping fingers are provided which can be brought in operative contact with the baking tong in such a manner so that a positive or a frictionally engaged connection is made. The baking tongs can be removed or supplied by means of the kinematics of the baking tong removal device and/or the baking tong feed device. Furthermore, as described further above, conveyor belts can be adapted for removal and/or for delivery of baking tongs. Optionally, as described further above, gripper beams can be provided along which gripping fingers are movably arranged so that the baking tongs can be moved and in particular can removed and delivered by the endless conveyor.

Optionally it is provided that in particular in the embodiment according to FIGS. 1b, 3b, 6b, 7b the locking lever or the locking device is or are controlled by a control rail. According to the previous description, this has a control gap in order to bring about a movement and thereby a control of the elements of the locking device. This control gap can either be configured as a gap in the conventional sense. However it is also consistent with the inventive idea that the gap is delimited by an elevation which is configured to control the locking device. Optionally this elevation is extended or retracted so that a control of the locking device is achieved.

In all embodiments it is optionally provided that a control is provided for the locking device. This control in particular has two positions. In a first position the locking devices or the locking levers are moved so that the baking tongs are or will be connected to the endless conveyor. In a second control position the locking devices or the locking levers remain opened so that baking tongs can be removed or supplied.

Optionally it is provided in all embodiments that the locking devices hold the closed baking tongs in the closed position. In particular, the baking plates are held in the closed position when they are deflected at the rear deflection point in order to be transported along the lower conveying surface. In this position the locking devices act in such a manner that an independent opening of the baking tongs caused by gravity is prevented. Optionally it is provided in all embodiments that the locking devices are adapted to close the baking tongs. This closing movement is in particular given by the control of the locking device. Optionally it is provided in all embodiments that the control of the locking device is accomplished by means of a control rail. Optionally it is provided in all embodiments that the baking tongs in the upper region of the endless conveyor lie on the endless conveyor but are not secured against lifting upwards. As a result, the baking tongs can be simply removed from the baking tong removal station. Only just before or at the rear deflection point the baking tongs are connected to the endless conveyor in such a manner that they cannot be separated from this in the lower region of the endless conveyor or also that these cannot open independently in this region. Optionally it is provided in all embodiments that the control of the baking tong removal station is coupled to the control of the baking machine so that a synchronized removal and supply of the baking tongs is made possible.

Optionally a detection unit is provided in all embodiments. This detection unit, for example an image processing unit, an image recording unit or another sensor are preferably suited and/or adapted to detect the state of each individual baking plate. For example, a degree of contamination of a baking tong and in particular of the baking mold can be determined by an image processing unit. In the case of a contamination, the baking tong can be removed in the baking tong station. These sensors or detectors are also coupled to the controller of the baking machine.

Optionally it can be provided in all embodiments that the baking tong removal station is used to make a product change. The shape of the baking molds substantially cannot be varied for a type of baking tongs. If, for example, the shape of the baking products to be produced is to be varied, new or different baking molds must be supplied. In order to be able to perform the product change in an automated manner, all the baking tongs can be removed in order. The gaps thus formed on the endless conveyor can be re-filled by new or different baking tongs. As a result, a fully automated product change is possible during ongoing operation but without dough infusion.

According to a further embodiment, the pre-baking device is merely a section of the baking machine which is located between the dough infusion and a subsequent infusion of a filling. The hot baking plates result in a pre-baking of the baking mass in the baking molds.

Optionally it is provided that the baking tongs in the upper region of the endless conveyor can be removed and also supplied. Optionally it is provided that the baking tongs are removed in the upper region and supplied in the lower region. Optionally it is provided that the baking tongs are connected to the endless conveyor and/or are locked in the closed position after or during supply by the locking device.

Optionally it is provided that a plurality of control gaps or control locations are provided. Preferably one for raising the baking tongs and one for incorporating the baking tongs.

Optionally it is provided that a ramp surface is provided which is raised from the control rail so that the control wheel optionally runs on his ramp surface in order to move the locking device or its locking lever. This ramp surface is optionally movable and in particular movable between two control positions.

REFERENCE LIST

1 Endless conveyor
2 Baking tongs
3 Baking chamber
4 Loading and removal station
5 Dough loading device
6 Release agent spray
7 Product removal device
8 Product conveyor
9 Deflecting roller front
10 Deflecting roller rear
11 Baking tong removal device
12 Baking tong feed device
13 Filling mass loading device
14 Upper oven chamber cover
15 Lateral oven chamber cover
16 Heater
17 Baking tong carriage
18 Running wheels
19 Running rail
20 Locking lever
21 Control rail
22 Control wheel
23 Upper baking mold
24 Lower baking mold
25 Baking tong axis
26 Conveying direction
27 Chain links
28 Baking mold recesses bottom
29 Baking mold recesses top
30 Dough feed tubes
31 Control gap
32 Fork
33 Folding device
34 Blocking finger
35 Locking fork
36 Gripper beam
37 Gripping finger
38 Transport device
39 Feed conveyor
40 Removal drums
41 Removal needles
42 Product
43 Retaining pin

The invention claimed is:

1. A baking apparatus for producing baked products, the baking apparatus comprising:
a continuously movable endless conveyor disposed to circulate in a longitudinal direction of a baking oven from a loading device, through a baking chamber of the baking oven, and to a product removal device;
openable and closable baking tongs;
said baking tongs including a lower baking mold and an upper baking mold, movably mounted about a baking tong axis between an open position and an closed closure position;
detachable mechanical connections detachably connecting said baking tongs to said endless conveyor;
a baking tong removal station at at least one location of said endless conveyor for removing said baking tongs from said endless conveyor and replacing said baking tongs on said endless conveyor;
a deflecting roller at a rear end on a baking chamber side of the baking apparatus, and said baking tong removal station being at said deflecting roller, said baking tong removal station containing a baking tong removal device, and a baking tong delivery device;
wherein a removal and a replacement of said baking tongs takes place on the continuously moving said endless conveyor.

2. The baking apparatus according to claim 1, wherein said detachable mechanical connection is formed by a locking device and said locking device and a movement thereof is controlled by a control rail.

3. The baking apparatus according to claim 1, wherein said baking tongs can be closed or are closed by said locking devices and said baking tongs can be firmly connected or are connected by said locking devices to said endless conveyor.

4. The baking apparatus according to claim 2, which comprises locking levers controlled by said control rail, each of said locking levers having a control wheel at an end thereof facing said control rail.

5. The baking apparatus according to claim 4, wherein said endless conveyor comprises chain links and said baking tongs are fastened, or can be fastened, on said chain links of said endless conveyor.

6. The baking apparatus according to claim 5, wherein said baking tongs sit on said chain links on both sides of said endless conveyor and are held firmly on said endless conveyor in the closed position by locking levers.

7. The baking apparatus according to claim 6, wherein a release of said baking tongs is effected by opening said locking levers.

8. The baking apparatus according to claim 5, wherein said baking tongs comprise retaining pins and a respective said locking lever holds said baking tongs optionally with a locking fork thereof firmly closed over said retaining pins and also firmly connected to said chain link of the endless conveyor.

9. The baking apparatus according to claim 1, wherein said baking tong removal device comprises a gripping beam on which movable and lowerable or raisable gripping fingers are disposed, to enable a baking tong to be raised from said endless conveyor and conveyed out from the baking chamber and to be transferred to a transport device for subsequent processing.

10. The baking apparatus according to claim 9, wherein said movable and lowerable or raisable gripping fingers are provided on said gripping beam which can be lowered in order to engage in said baking tong to be exchanged and in order to raise the baking tong from said endless conveyor, convey said baking tong from the baking chamber and transfer said baking tong to a conveyor for subsequent processing.

11. The baking apparatus according to claim 1, wherein said baking tong delivery device comprises a feed conveyor configured to bring a new baking tong up to a lower section of said endless conveyor so that said baking tong which has been brought close is connected to said endless conveyor by said locking device.

12. The baking apparatus according to claim 1, which comprises a preheating device for preheating said baking tong prior to receiving baking dough so as to maintain a constant baking temperature.

13. The baking apparatus according to claim 12, wherein said preheating device is configured to preheat said new baking tongs before transfer or to preheat said baking tong after placement on said conveyor.

14. The baking apparatus according to claim 1, configured for producing filled baked products, wherein:
   said baking tongs comprise a lower baking mold and an upper baking mold movably mounted about a baking tong axis between a 180° open position and a closed closure position and lockable in the closed position;
   said loading device including at least one dough loading device for loading said lower and upper baking molds in the opened position and at least one filling mass loading device for applying the filling mass to a layer of said lower and/or upper baking mold loaded with dough.

15. The baking apparatus according to claim 1, wherein said baking tong axis is arranged transversely to a conveying direction of said endless conveyor.

16. The baking apparatus according to claim 15, wherein said baking tong axis extends at an angle of substantially 90° to the conveying direction of said endless conveyor.

17. The baking apparatus according to claim 1, which comprises a folding device for each baking tong, for opening and closing said baking tongs, wherein said folding devices are controlled according to a respective position along said endless conveyor so that said baking tongs are moved in the closed position or open position and that said folding devices each have a respective fork and said folding devices for opening and closing said baking tongs are arranged in front of a product removal station and in front of an inlet into said baking chamber.

18. The baking apparatus according to claim 1, wherein:
   said baking tongs are arranged on the endless conveyor consecutively in a conveying direction from the loading and removal station into said baking chamber and after passing a deflecting roller are moved back again to the loading and removal station; and
   said baking tongs are brought by a second deflecting roller again into an upper section of said endless conveyor where the respective said baking tong again emerges from said baking chamber in a lower section of said endless conveyor and after passing the deflecting roller is opened for removing the products.

19. The baking apparatus according to claim 1, which comprises running rails and baking tong carriages provided with running wheels on two sides thereof, wherein said running wheels are configured to roll on said running rails of the baking oven.

* * * * *